United States Patent [19]

Steigenberger et al.

[11] 4,324,440
[45] Apr. 13, 1982

[54] CONTAINING BEARING FOR SUPERCRITICAL ROTORS

[75] Inventors: Richard Steigenberger, Friedberg; Dieter Hirt, Augsburg, both of Fed. Rep. of Germany

[73] Assignee: MAN Maschienfabrik Augsburg Nurnberg, Munich, Fed. Rep. of Germany

[21] Appl. No.: 158,622

[22] Filed: Jun. 11, 1980

[30] Foreign Application Priority Data

Jun. 20, 1979 [DE] Fed. Rep. of Germany ....... 2924815

[51] Int. Cl.$^3$ ............................................. F16C 27/04
[52] U.S. Cl. ................................. 308/26; 308/184 R; 308/DIG. 15
[58] Field of Search ...... 308/26, 184 A, 10, DIG. 15, 308/35, 189 R, 184 R

[56] References Cited

U.S. PATENT DOCUMENTS

| | | |
|---|---|---|
| 3,360,310 | 12/1967 | Hiatt et al. ............................ 308/35 |
| 3,394,875 | 7/1968 | Hasa et al. .................. 308/DIG. 15 |
| 4,179,075 | 12/1979 | Rachais ................................ 308/10 |

*Primary Examiner*—Lenard A. Footland
*Attorney, Agent, or Firm*—Scully, Scott, Murphy & Presser

[57] ABSTRACT

A containing bearing for supercritical rotors surrounding the rotor and operating to stabilize the rotor in the presence of radial rotor vibrations. A gap is present between the containing bearing and the rotor and is of a size equal to or larger than the maximum amplitude of vibration of the rotor in normal operation. An outer race of the containing bearing is supported by an oblong, resilient sleeve which extends coaxially to and in extension of the rotor which at its far end is fixed to prevent rotation.

10 Claims, 1 Drawing Figure

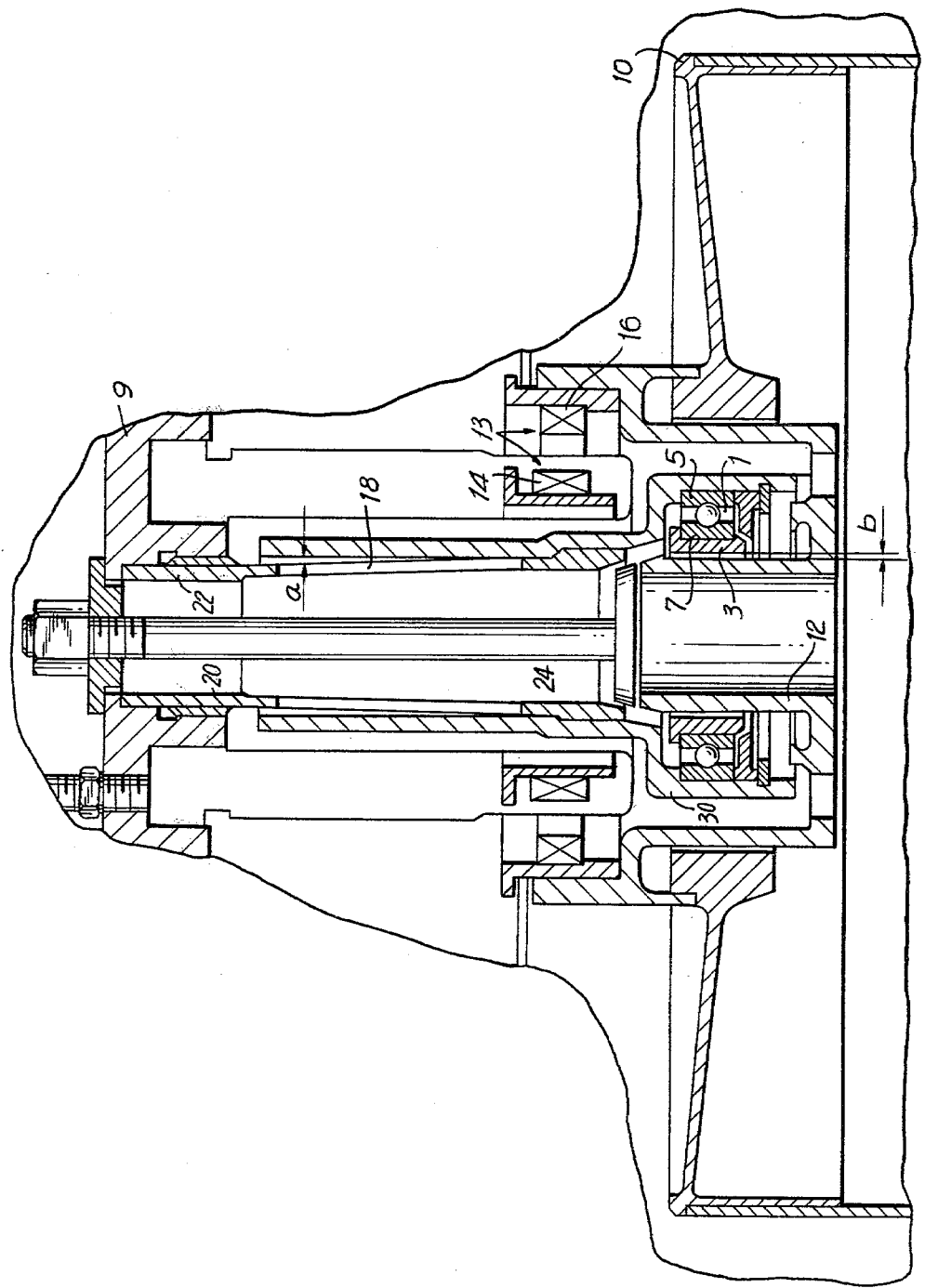

CONTAINING BEARING FOR SUPERCRITICAL ROTORS

The present invention relates to a containing bearing for rotors operating at above critical speeds. The bearing surrounds the rotor and operates to stabilize the rotor in the presence of radial rotor vibrations, where a defined gap is provided between the containing bearing and the rotor of a size equal to or greater than, the maximum rotor amplitude in normal operation.

The need for ever higher rotor speeds as encountered in turbine and compressor areas and similar fields, has already led to speed regimes ranging above the critical bending speed of the rotor. It has been attempted in the start-up phase of the rotor, to push the rotor through the critical speeds with augmented drive power. This approach will succeed, however, only when the rotors involved are ideally balanced, so that attempts at stabilization will rather revolve around suitable bearings. This is why the containing type of bearing is increasingly gaining in importance.

Containing bearings, serve no bearing functions so long as the rotor operates smoothly, and come into action at aggravated amplitudes of vibration when they are engaged mechanically in response to rotor deflections.

Unlike the usual damping bearings, which serve to carry and support the rotor, a containing bearing is a stand-by bearing, as it were, which comes into action intermittently, especially as the critical speed ranges are being traversed.

When the rotor fouls with the containing bearing as a result of growing amplitudes of vibration, the damping member associated with the containing bearing extracts energy from the rotor, and when the mass of the containing bearing is engaged to rotate together with the rotor, the natural frequency of the system will change. Both events operate to keep the rotor from unduly deflecting, and they shorten the time it needs to clear the critical speed range as it is being run up to speed.

The effectiveness of a containing bearing depends on a number of factors, where the time at which the bearing comes into action and the ability of the bearing to respond are considerations.

Further requirements for containing bearings are occasioned by the intended high speeds of the rotors. It will be necessary to minimize the extraction of drive energy. For this reason, the containing bearing and rotor system should be free of friction when running between critical speeds, and it should give little friction when the bearing is in action. For this purpose, a previously disclosed containing bearing is provided with a certain gap between the bearing and the rotor of a size equal to or larger than the maximum amplitude of vibration of the rotor in normal operation. As the rotor passes a critical speed, the preselected gap must first be bridged before the rotor is intercepted by the containing bearing. This ensures that the rotor makes no contact at its free condition and, again, that the damping effect in the critical ranges occurs early. In the fouling and free conditions of the rotor, use can optionally be made of a highly wear-resistant, thermally non-conductive, self-lubricating stop sleeve attached in the gap area, to either the bearing or the rotor.

When a critical speed is being traversed and a containing bearing comes into action, the bearing is subjected at that moment, not alone to extreme circumferential forces of acceleration, but also to extreme radial jolts that are difficult to control and they may well be sufficiently severe to damage a bearing. In the present state of the art, the main bearings that operate only in normal operation have damping means and the containing bearing equally has damping means. As damping means for containing bearings, use is normally made of hydrostatic systems of comparatively complex construction if they are to provide adequate damping characteristics in operation. More particularly, the sealing provisions for static damping systems are a problem that needs very special attention, considering that reliable operation of the containing bearing is ensured, provided the damping means is properly sealed.

In a broad aspect of the present invention, the initially mentioned containing bearing for supercritical rotors, having a gap, provides an improved and simple, reliably operating mechanical arrangement to achieve adequate damping or spring characteristics.

SUMMARY OF INVENTION

It is a particular object of the present invention to provide an arrangement where the outer race of the containing bearing is supported by an oblong resilient sleeve arranged coaxially to an in extension of the rotor, the far end of the sleeve being fixed to prevent rotation.

The oblong sleeve, being fixed at one end to a stationary mounting, creates a lever arm between the point of fixation and the fouling point of the rotor. The lever arm essentially governs the damping and spring characteristics of the sleeve and is selected to best suit the particular rotor involved. The outer race of the containing bearing is radially flexibly supported, and dampens radial rotor joints as the critical speed is being traversed, and it enables, by the restoring action of the resilient sleeve, the rotor to run free of the bearing when in the supercritical speed range.

An advantage of the present invention relates to the fact that the sleeve exhibits circumferentially equally spaced longitudinal slots. The number and disposition of these slots can be selected to affect the spring characteristic of the sleeve.

In a further aspect of the present invention, the outer race of the containing bearing is arranged in an oblong bearing sleeve which when compared with the resilient sleeve is relatively stiff, and is arranged concentrically with respect to the resilient sleeve, being attached at the free end of the resilient sleeve. This provides a stable arrangement for the containing bearing without impairing the spring and damping properties of the sleeve.

In a further aspect of the present invention, the bearing sleeve is seated over the resilient sleeve with provisions to prevent sliding motion.

Still another aspect of the present invention relates to a circumferential gap formed between the point of attachment of the bearing sleeve at the free end of the resilient sleeve and the seating portion of the bearing sleeve, the gap widens towards the top and has a wedge-like appearance when seen in elevation view. This wedge shape is produced by making the seating portion of the bearing sleeve cylindrical and making the free portion of the resilient sleeve conical. By this arrangement, the linear stiffness of the spring is made progressive, because as a result of the form of the gap between the resilient sleeve and the bearing sleeve a modest difference in angle, when viewed in sectional representation, causes the lever arm to be shortened as the containing bearing is increasingly deflected after the rotor is contacted. As the time the rotor starts fouling, the resilient sleeve is comparatively soft, with the bearing sleeve being arranged coaxially to the resilient sleeve at a maximally effective lever arm. With increasingly severe deflection of the containing bearing, an angle is formed between the bearing sleeve and the resilient sleeve because of the gap forming between them, so that the effective lever arm and the effective spring portion of the resilient sleeve is shortened, making the stiffness of the resilient sleeve progressive.

A further advantageous aspect of the present invention has the resilient sleeve slotted and the seating portion of the stiff bearing sleeve overlapping the slotted portion of the resilient sleeve in an axial direction, producing a notable stiffness of the spring at an extremely short effective lever arm.

Still another advantageous aspect of the present invention has the gap in the shape of steps or stairs when seen in elevation view of the sleeves. In operation, this will produce a stepped progressive spring characteristic to help the rotor clear the containing bearing in the supercritical speed range.

The damping characteristic can be made to suit specific applications, if an intervening damping substance is used on or in the seating area of the two sleeves, where the form of the gap is being maintained. As a damping substance, use is advantageously made of vulcanized rubber.

It will be helpful to widen the seating portion of the stiff bearing sleeve at the inner circumference to accommodate the damping substance while maintaining the form of the gap.

Further objects and advantages of the present invention are described more fully in light of the accompanying drawing.

IN THE DRAWINGS

The single FIGURE of the invention illustrates the bearing of a rotor in sectional view.

DESCRIPTION OF THE INVENTION

With reference now to the drawings, a rotor 10 is rotably supported by a stationary housing 9 via a main damper bearing 13. The main damper bearing 13 exhibits a magnetic ring 14 allied with a reverse-pole magnetic ring 16 of the rotor 10 to enable the rotor to run without mechanical contact as long as operating conditions are normal.

The relatively short stub shaft 12 of the rotor 10 revolves normally, i.e. when the amplitudes of the rotor vibrations remain within limits, with no mechanical contact, inside a containing bearing 1, which in turn is radially flexibly supported by the stationary housing 9 via its outer race 5, a rigid, oblong bearing sleeve 30 and, having a resilient sleeve 20 seated therein. The inner race of the containing bearing 1, exhibits a highly wear-resistant, thermally poorly conducting, self-lubricating stop bush 3, where the assembled condition of the arrangement a gap "b" is formed between the stop bush 3 and the rotor shaft 12 at standstill or in normal operation.

The resilient sleeve 20 is fixedly connected to the stationary housing 9 at its upper end to prevent rotation, and it extends coaxially to the rotor 10 while flaring towards its lower end, which points towards the rotor shaft 12. Between its ends, the sleeve 20 is provided with circumferentially equally spaced, longitudinal slots 18. At its lower end, the oblong cylindrical bearing sleeve 30 accommodates the outer race of the containing bearing 1, and near this lower end, it is seated upon the lower end 24 of the resilient sleeve 20. It terminates at a point above the longitudinal slotted 18 area of the resilient sleeve 20. Owing to the taper of the resilient sleeve 20 and the cylindrical shape of the bearing sleeve 30, a conical circumferential gap "a" exists between the two, and widens towards the top.

The wedge-shaped or stepped configuration of the circumferential gap "a" makes for progressive rigidity of the "spring" (i.e. the resilient sleeve 20) if during operation, the rotor 10 fouls with the resilient bearing 1, where the rotor shaft 12 and the stop sleeve come into contact. Progressive rigidity of the spring is achieved especially by increasingly pronounced deflection of the resilient bearing 1, where the bearing sleeve 30 changes its angle relative to the spring sleeve 20, owing to the widening gap between them, causing the effective lever arm to the point of fixation 22 of the resilient sleeve to be shortened.

Due to the progressive rigidity of the spring, the load on the resilient bearing 1 is minimized at the time of rotor achieves and exceeds critical speed, and at once a spring restoring force is generated which causes the rotor 10 to automatically stabilize once the critical speed is exceeded and which, therefore, helps the rotor shaft 12 to come clear of the stop bush 3.

Should the damping effect of the resilient sleeve 20 acting through the bearing sleeve 30 not be sufficient or not be effective over the entire frequency range, a damping mass provided in the circumferential gap "a" formed between the sleeves 20 and 30, will augment the damping action for the fouling rotor. If necessary, the circumferential gap "a" is widened by boring or turning the bearing sleeve 30 to provide sufficient space for the damping substance, which preferably is vulcanized rubber.

BEST MODE OF THE INVENTION

A containing bearing for supercritical rotors surrounding the rotor and operating to stabilize the rotor in the presence of radial rotor vibrations. A gap is present between the containing bearing and the rotor and is of a size equal to or larger than the maximum amplitude of vibration of the rotor in normal operation. A outer race (5) of the containing bearing (1) is supported by an oblong, resilient sleeve (20) which extends coaxially to and in extension of the rotor (10) which at its far end (22) is fixed to prevent rotation.

Many modifications and variations of the present invention are possible in light of the above teachings. It is, therefore, to be understood that within the scope of the appended claims, the invention may be practiced otherwise than as particularly described.

We claim:

1. A containing bearing for a supercritical rotor which surrounds the rotor is adapted to stabilize the rotor in the presence of radial rotor vibrations, a gap is present between the containing bearing and the rotor, said gap being of a size equal to or larger than the maximum amplitude of vibration of the rotor in normal operation, wherein: an outer race (5) of the containing bearing (1) is supported by an oblong, resilient sleeve (20) which extends coaxially to and in extension of the rotor (10) and is further defined by having its far end (22) fixed to prevent its rotation.

2. A containing bearing as claimed in claim 1, wherein: the resilient sleeve (20) is provided with circumferentially equally spaced longitudinal slots (18).

3. A containing bearing as claimed in either claim 1, wherein: the outer race (5) of the containing bearing (1) is arranged in an oblong relatively stiff bearing sleeve (30), which is concentric with respect to the resilient sleeve (20) and is attached at the free end (24) of the resilient sleeve.

4. A containing bearing as claimed in claim 3, wherein: the bearing sleeve (30) is seated over the resilient sleeve (20) and being adapted to prevent sliding motion.

5. A containing bearing as claimed in claim 4, wherein: a circumferential gap (a) is provided between two sleeves (20, 30) in the area between the bearing sleeve attaching point at the free end (24) of the resilient sleeve (20) and the fixed end (22) of the resilient sleeve (20), said gap widens from the bearing sleeve (30) attaching point (24) at the free end of the resilient sleeve towards the fixed end of the resilient sleeve.

6. A containing bearing as claimed in claim 5, wherein: the gap (a) flares conically.

7. A containing bearing as claimed in claim 6, wherein: the seating portion of the bearing sleeve (30) is cylindrical and the free portion (24) of the resilient sleeve (20) is conical in shape.

8. A containing bearing as claimed in claim 5, wherein: the gap (a) when seen in elevation view of the sleeves (20, 30) is stepped.

9. A containing bearing as claimed in claim 8, wherein: the damping substance is vulcanized rubber.

10. A containing bearing in either one of claims 4, 5, 6, 7 or 8, wherein: an intervening damping substance is provided in the seating area of the sleeves (20, 30).

* * * * *